United States Patent
Sugiyama

(10) Patent No.: US 9,219,415 B2
(45) Date of Patent: Dec. 22, 2015

(54) SWITCHING POWER SUPPLY CIRCUIT

(71) Applicant: ASAHI KASEI MICRODEVICES CORPORATION, Tokyo (JP)

(72) Inventor: Toshio Sugiyama, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 18 days.

(21) Appl. No.: 14/130,340

(22) PCT Filed: Aug. 21, 2013

(86) PCT No.: PCT/JP2013/004945
§ 371 (c)(1),
(2) Date: Dec. 31, 2013

(87) PCT Pub. No.: WO2014/049945
PCT Pub. Date: Apr. 3, 2014

(65) Prior Publication Data
US 2014/0300330 A1  Oct. 9, 2014

(30) Foreign Application Priority Data

Sep. 27, 2012  (JP) ................................. 2012-214665

(51) Int. Cl.
*G05F 1/00* (2006.01)
*H02M 3/158* (2006.01)
(Continued)

(52) U.S. Cl.
CPC .............. *H02M 3/158* (2013.01); *H02M 3/156* (2013.01); *H02M 2001/0009* (2013.01); *H02M 2001/0019* (2013.01); *H02M 2003/1566* (2013.01)

(58) Field of Classification Search
CPC .... H02M 3/1588; H02M 3/156; H02M 3/157
USPC .......................................... 323/271, 282–288
See application file for complete search history.

(56) References Cited

U.S. PATENT DOCUMENTS 6,894,471 B2 * 5/2005 Corva et al. .................... 323/282
7,642,762 B2 * 1/2010 Xie et al. ....................... 323/282
(Continued)

FOREIGN PATENT DOCUMENTS

JP   H01-312468 A   12/1989
JP   2012-125107 A   6/2012

OTHER PUBLICATIONS

Written Opinion of the International Searching Authority dated Mar. 18, 2014 for corresponding International Application No. PCT/JP2013/004945.

(Continued)

*Primary Examiner* — Timothy J Dole
*Assistant Examiner* — Htet Z Kyaw
(74) *Attorney, Agent, or Firm* — Morgan, Lewis & Bockius LLP

(57) ABSTRACT

There is provided a switching power supply circuit (1) for supplying a power supply voltage to a load through a transmission line PL. The switching power supply circuit (1) includes: a voltage conversion unit (11) for inputting thereinto an input voltage VIN and a control signal Vc, converting the input voltage VIN into an output voltage Vo having a magnitude corresponding to the control signal Vc, and outputting the output voltage Vo to the transmission line PL; a signal generation unit (12) for monitoring a load current ILOAD flowing through the transmission line PL and generating a signal corresponding to a voltage dropped in the transmission line PL; and a low pass filter (13) for outputting the signal generated in the signal generation unit (12) to the voltage conversion unit (11) as the control signal Vc.

8 Claims, 7 Drawing Sheets

(51) Int. Cl.
*H02M 3/156* (2006.01)
*H02M 1/00* (2007.01)

(56) References Cited

U.S. PATENT DOCUMENTS 8,129,972 B2 * 3/2012 Audy ............................ 323/285
8,779,747 B2 * 7/2014 Su et al. ........................ 323/285
2012/0146605 A1 6/2012 Oyama

OTHER PUBLICATIONS

International Search Report dated Sep. 17, 2013 for International application No. PCT/JP2013/004945.

* cited by examiner

SWITCHING POWER SUPPLY CIRCUIT

TECHNICAL FIELD

The present invention relates to a switching power supply circuit for supplying a power supply voltage to a load through a transmission line, and more particularly, to a switching power supply circuit for supplying a power supply voltage in consideration of a voltage that drops in the transmission line.

BACKGROUND ART

In a power supply such as a battery, the voltage thereof changes depending on the amount of a residual energy, the ambient temperature, and the weight of a load of an electronic device to be driven. However, it is desired to supply a stable voltage to the electronic device. As a circuit that supplies the stable voltage to the electronic device from the power supply in which the voltage thereof changes, there is known a switching power supply circuit such as a DC-DC convertor.

As an example of the switching power supply circuit, an AC adapter is known. The AC adapter uses a commercial power supply as an input, and supplies the power supply voltage to the load through the transmission line (transmission cable).

Further, there is also known another switching power supply circuit built in a personal computer or the like, and charges a battery built in a digital camera though a transmission line such as a USB cable by connecting the transmission line to the personal computer and the digital camera.

Furthermore, as an in-vehicle use, there is also known further another switching power supply circuit built in a car accessory such as a car navigation, a car audio, or the like, and charges a battery built in a multifunction mobile phone such as a smart phone or an information terminal through a transmission line inside the vehicle such as a cable of several meters by connecting the transmission line to the multifunction mobile phone or the information terminal.

In a switching power supply circuit that supplies a power supply voltage to the load through the transmission line in this manner, a voltage drop occurs due to the resistance of the transmission line. As a result, a power supply voltage actually supplied to the load is made lower than a power supply voltage that should be originally supplied thereto. Therefore, it is demanded to output a voltage higher than a power supply voltage that should be supplied to the load by a voltage that will drop in the transmission line.

Especially, in a charging system that charges a battery or the like through the transmission line, a current in the order of several amperes flows through the transmission line, and a voltage drop in the transmission line is in the order of several hundred millivolts. Therefore, it is important for the switching power supply circuit to output the voltage higher than a power supply voltage that should be supplied to the load by the voltage that will drop in the transmission line.

Patent Document 1, for example, describes the switching power supply circuit in which a voltage that will drop in the transmission line is generated, the generated voltage is added to the power supply voltage that is desired for the load, and the added voltage is output to the transmission line in this manner.

PRIOR ART DOCUMENT

Patent Document

Patent Document 1: JP H01-312468 A

SUMMARY OF THE INVENTION

Problem to be Solved

However, in the conventional switching power supply circuit, a period of time from when a load variation occurs to when the load variation is stabilized is disadvantageously long, and the response speed is low, accordingly. Therefore, there is a demand for a switching power supply circuit capable of further increasing the response speed to the load variation.

Accordingly, the present invention has been made in view of the above unsolved problem, and has an object to provide a switching power supply circuit capable of further improving the response speed to the load variation.

Solution to the Problem

According to an aspect of the present invention, there is provided a switching power supply circuit (for example, a switching power supply circuit 1 in FIG. 1) for supplying a power supply voltage to a load (for example, a load resistance $R_L$ in FIG. 1) through a transmission line (for example, a transmission line PL in FIG. 1), the switching power supply circuit including: a voltage conversion unit (for example, a voltage conversion unit 11 in FIG. 1) for receiving an input voltage, converting the input voltage into an output voltage having a magnitude corresponding to a control signal, and outputting the output voltage to the transmission line; a signal generation unit (for example, a signal generation unit 12 in FIG. 1) for generating a signal corresponding to a voltage to be dropped in the transmission line on the basis of a current flowing through the transmission line; and a low pass filter (for example, a low pass filter 13 in FIG. 1) for receiving the signal generated in the signal generation unit, smoothing the input signal, and outputting the control signal to the voltage conversion unit.

The signal generation unit (for example, the signal generation unit 12 in FIG. 1) may include: a sense resistance (for example, a sense resistance $R_{LDS}$ in FIG. 1) electrically connected in series to the transmission line; and a level shift circuit (for example, a level shift circuit LS2 in FIG. 1) for level-shifting a voltage across both ends of the sense resistance to a voltage based on a reference voltage corresponding to the power supply voltage.

The low pass filter (for example, the low pass filter 13 in FIG. 1) may include: a resistance element (for example, a resistance $R_{LPF}$ in FIG. 1) having one end connected to an output end of the level shift circuit; and a capacitance element (for example, a capacitance $C_{LPF}$ in FIG. 1) having one end connected to the other end of the resistance element, and the other end connected to a reference voltage terminal (for example, a reference voltage terminal Tref2 in FIG. 1) having the reference voltage.

The signal generation unit (for example, a signal generation unit 12b in FIG. 8) may include: a sense resistance (for example, a sense resistance Rs in FIG. 8) electrically connected in series to the transmission line; and a transconductance amplifier (for example, a transconductance amplifier gmLD in FIG. 8) for amplifying a voltage across both ends of the sense resistance and outputting a current corresponding to the voltage across the both ends of the sense resistance.

The low pass filter (for example, a low pass filter 13a in FIG. 8) may include: a resistance element (for example, a resistance $R_{LD}$ in FIG. 8); and a capacitance element (for example, a capacitance $C_{LD}$ in FIG. 8), the resistance element and the capacitance element being connected in parallel to each other between an output end of the transconductance amplifier (for example, the transconductance amplifier gmLD in FIG. 8) and a reference voltage terminal (for example, a reference voltage terminal Tref in FIG. 8) having a reference voltage corresponding to the power supply voltage.

The voltage conversion unit (for example, the voltage conversion unit 11 in FIG. 1) may include an output capacitance (for example, an output capacitance Co in FIG. 1) connected between an output terminal (for example, an output terminal To in FIG. 1) of the voltage conversion unit and a ground, and a time constant of the low pass filter (for example, the low pass filter 13 in FIG. 1) may be larger than a product of a capacitance value of the output capacitance, a resistance value of the sense resistance (for example, the sense resistance $R_{LDS}$ in FIG. 1), and an amplification factor of the level shift circuit (for example, the level shift circuit LS2 in FIG. 1).

The voltage conversion unit (for example, the voltage conversion unit 11 in FIG. 8) may include an output capacitance (for example, an output capacitance Co in FIG. 8) connected between an output terminal (for example, an output terminal To in FIG. 8) of the voltage conversion unit and a ground, and a time constant of the low pass filter (for example, the low pass filter 13a in FIG. 8) may be larger than a product of a capacitance value of the output capacitance, a resistance value of the sense resistance (for example, a sense resistance Rs in FIG. 8), and an amplification factor of the transconductance amplifier (for example, a transconductance amplifier gmLD in FIG. 8).

The voltage conversion unit (for example, the voltage conversion unit 11 in FIG. 7) may include: an inductor (for example, an inductor Lo in FIG. 7) connected between an input terminal (for example, an input terminal Tin in FIG. 7) to which the input voltage is input and an output terminal (for example, an output terminal To in FIG. 7); and an output capacitance (for example, an output capacitance Co in FIG. 7) connected between the output terminal and a ground, and the sense resistance (for example, a sense resistance Rs in FIG. 7) may be connected between the inductor and the output capacitance and monitor a current flowing through the inductor.

The voltage conversion unit (for example, the voltage conversion unit 11 in FIG. 7) may include: an inductor (for example, the inductor Lo in FIG. 7) connected between an input terminal (for example, the input terminal Tin in FIG. 7) to which the input voltage is input and an output terminal (for example, the output terminal To in FIG. 7); and the output capacitance (for example, the output capacitance Co in FIG. 7), and the sense resistance (for example, the sense resistance Rs in FIG. 7) may be connected between the inductor and the output capacitance and monitor a current flowing through the inductor.

Advantageous Effects of the Invention

According to one aspect of the present invention, it is possible to easily ensure the phase margin by providing the low pass filter on the output side of the signal generation unit, even if the frequency band of the amplitude characteristic of a feedback loop is made wider. As a result, it is possible to improve the response speed to the load variation.

DESCRIPTION OF EMBODIMENTS

Hereinafter, embodiments of the present invention will be described with reference to the accompanying drawings.

First Embodiment

First, the first embodiment will be described.

Figure 1:
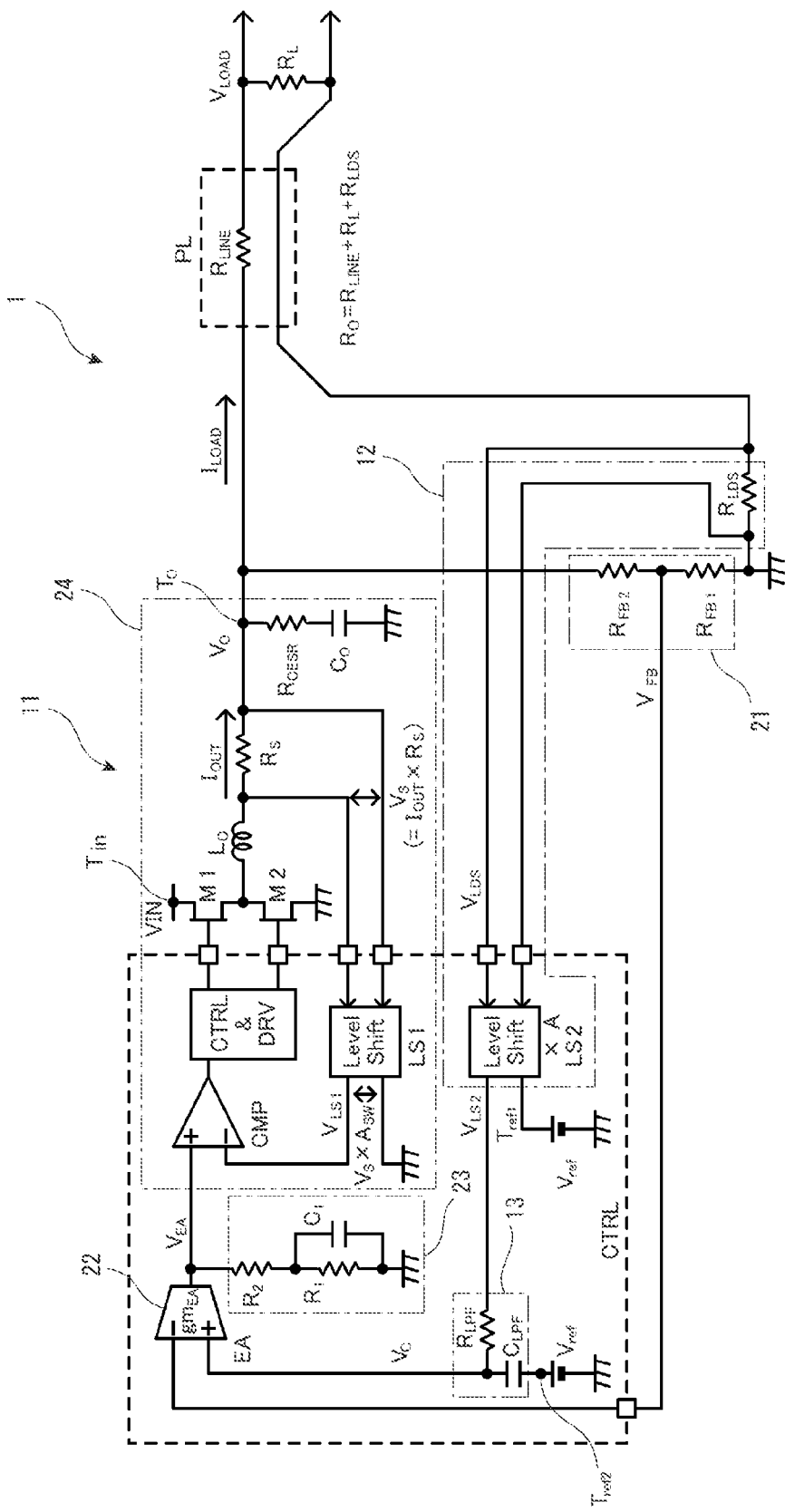
FIG. 1 is a schematic configuration diagram illustrative of an example of a switching power supply circuit to which a first embodiment of the present invention is applied.

FIG. 1 is a schematic configuration diagram illustrative of an example of a switching power supply circuit to which the first embodiment of the present invention is applied.

The switching power supply circuit 1 according to the first embodiment is a current mode DC-DC converter. An output terminal To of the switching power supply circuit 1 is connected to one end of a transmission line PL, and one end of a load $R_L$ is connected to the other end of the transmission line PL. The other end of the load $R_L$ is connected to a ground line inside the transmission line PL.

The switching power supply circuit 1 includes: a voltage conversion unit 11 for outputting an output voltage Vo in accordance with an input voltage VIN to the transmission line PL; a signal generation unit 12 for generating a signal in accordance with a voltage that drops in the transmission line PL; and a low pass filter 13 for generating a control signal Vc in accordance with the dropped voltage generated in the signal generation unit 12.

The voltage conversion unit 11 includes: a resistance division circuit 21 for dividing the output voltage Vo to generate a feedback voltage $V_{FB}$; an error amplifier (EA) 22; a phase compensation impedance unit 23; and an output voltage generation unit 24.

The resistance division circuit 21 includes resistances $R_{FB1}$ and $R_{FB2}$ which are connected in series to each other between the output terminal To and the ground. The resistance division circuit 21 divides the output voltage Vo which is a terminal voltage of the output terminal To to generate the feedback voltage $V_{FB}$.

The error amplifier 22 has an inversion terminal into which the feedback voltage $V_{FB}$ from the resistance division circuit 21 is input and a non-inversion input terminal into which the control signal Vc, to be described later, is input. The error amplifier 22 outputs an error current proportional to an error between the feedback voltage $V_{FB}$ and the control signal Vc.

The phase compensation impedance unit 23 includes: resistances $R_1$ and $R_2$ connected in series to each other; and a capacitance $C_1$ connected in parallel to the resistance $R_1$. One end of the phase compensation impedance unit 23 on the side of the resistance $R_2$ is connected to an output end of the error amplifier 22, and the other end thereof on the side of the resistance $R_1$ is connected to the ground. The phase compensation impedance unit 23 integrates the error current output from the error amplifier 22 to generate a level error voltage $V_{EA}$ and performs phase compensation.

The output voltage generation unit 24 includes: a sense resistance Rs for voltage-converting an output current Iout, of a triangular wave, generated by converting the input voltage VIN to generate a triangular wave voltage Vs; a level shift circuit LS1 which has an amplification factor $A_{SW}$ and amplifies the triangular wave voltage Vs by $A_{SW}$ times so as to be compared to the level error voltage $V_{EA}$ to perform a level shift of the triangular wave voltage Vs; a comparator CMP for comparing the level error voltage $V_{EA}$ and an output voltage $V_{LS1}$ of the level shift circuit LS1 to each other to generate a PWM signal having a duty proportional to the magnitude of the level error voltage $V_{EA}$; and a control driver CTRL & DRV for buffering the PWM signal output from the comparator CMP. The output voltage generation unit 24 further includes: switches M1 and M2 connected in series to each other between an input terminal Tin and the ground, and each of them includes a MOS transistor; an inductor Lo connected between a common connection part of the switch M1 and the switch M2, and the sense resistance Rs; and an output capacitance Co connected between the output terminal To and the ground, and forms a filter together with the inductor Lo. A resistance $R_{CESR}$ connected between the output terminal To and the output capacitance Co is an equivalent series resistance (internal resistance) of the output capacitance Co. Further, the transmission line PL includes an internal resistance $R_{LINE}$.

The input voltage VIN input into the input terminal Tin is intermittently output from the common connection part of the switch M1 and the switch M2, then smoothed by the filter formed of the inductor Lo and the output capacitance Co, and then output from the output terminal To as the output voltage Vo.

The signal generation unit 12 includes: a sense resistance $R_{LDS}$ connected between the transmission line PL and the ground; and a level shift circuit LS2. The sense resistance $R_{LDS}$ monitors a load current $I_{LOAD}$ flowing across the load $R_L$ connected to the transmission line PL to perform a current/voltage conversion. The level shift circuit LS2 outputs a voltage $V_{LS2}$ obtained by amplifying a voltage $V_{LDS}$ corresponding to the load current $I_{LOAD}$ which has been voltage-converted by the sense resistance $R_{LDS}$ at the amplification factor A, and also level-shifting the voltage $V_{LDS}$ to a voltage based on a reference voltage Vref.

That is to say, the level shift circuit LS2 has the amplification factor A, and multiplies the voltage $V_{LDS}$ corresponding to the load current $I_{LOAD}$ as a differential input signal by A and adds the multiplied voltage $V_{LDS}$ to the reference voltage Vref to be output.

Herein, the level shift circuit LS2 includes a well-known level shift circuit such as a drain grounding amplification circuit. The level shift circuit LS1 has the same configuration as the level shift circuit LS2, and includes a well-known level shift circuit such as a drain grounding amplification circuit.

The reference voltage Vref of a reference voltage terminal Tref1 which is a reference when performing level shift in the level shift circuit LS2 is a voltage corresponding to a desired voltage that should be supplied to the load $R_L$ when the load current $I_{LOAD}$ is zero. In other words, the reference voltage Vref is a voltage corresponding to a power supply voltage $V_{LOAD}$ that should be supplied to the load $R_L$.

The low pass filter 13 includes: a resistance $R_{LPF}$ one end of connected to an output end of the level shift circuit LS2 from which an output voltage $V_{LS2}$ is output; and a capacitance $C_{LPF}$ connected between the afore-mentioned one end of the resistance $R_{LPF}$ and a reference voltage terminal Tref2 into which the reference voltage Vref is input. The control signal Vc obtained by smoothing the output voltage $V_{LS1}$ of the level shift circuit LS2 is output from the common connection part of the resistance $R_{LPF}$ and the capacitance $C_{LPF}$. That is, the output voltage VLS2 of the level shift circuit LS2 is output to the error amplifier 22 through the low pass filter 13.

The reference voltage terminal Tref2 is connected to the ground through a power supply which supplies the reference voltage Vref.

The reference voltage terminal Tref1 and the reference voltage terminal Tref2 may be shared to share the power supply for supplying the reference voltage Vref.

The error amplifier 22, the phase compensation impedance unit 23, the comparator CMP, the control driver CTRL & DRV, the level shift circuits LS1 and LS2, and the low pass filter 13 constitute a DC-DC converter which converts the input voltage VIN into the output voltage Vo, namely, a control circuit CTRL of the switching power supply circuit. By the control circuit CTRL complementarily on/off controlling the switches M1 and M2, a current corresponding to a difference between the output voltage Vo and a desired voltage that should be supplied to the load $R_L$ is generated. Therefore, the terminal voltage of the output terminal To increases. As a result, the output voltage Vo is maintained constant.

With the configuration described above, the voltage of a non-inversion input terminal of the error amplifier 22 is a voltage that increases the output voltage Vo by an amount corresponding to a voltage drop in the internal resistance $R_{LINE}$ of the transmission line PL. That is to say, according to the voltage of the non-inversion input terminal of the error amplifier 22, the output voltage Vo has a value obtained by adding "a voltage drop in the transmission line PL" (=the load current $I_{LOAD}$×the internal resistance $R_{LINE}$) to a desired output voltage when the load current $I_{LOAD}$ is zero.

When the load current $I_{LOAD}$ has a certain current value, the voltage $V_{LDS}$ proportional to the load current $I_{LOAD}$ is shifted to a level based on the reference voltage Vref by the level shift circuit LS2. Further, the control signal Vc composed of a voltage corresponding to the load current $I_{LOAD}$ filtered by the low pass filter 13 (the resistance $R_{LPF}$ and the capacitance $C_{LPF}$) is input into the error amplifier 22. Then, the error amplifier 22 outputs an error current proportional to a difference between the feedback voltage $V_{FB}$ and a voltage based on the reference voltage Vref corresponding to the load current $I_{LOAD}$.

The error current is accumulated in the capacitance $C_1$, and the level error voltage $V_{EA}$ is generated. A current flowing through the inductor Lo by switching operations of the switches M1 and M2 becomes a triangular wave current. Therefore, the voltage Vs across both ends of the sense resistance Rs also becomes a triangular wave voltage. Further, the output voltage VLS1 of the level shift circuit LS1 also becomes a triangular wave voltage. Since the comparator CMP compares the level error voltage $V_{EA}$ with the output voltage $V_{LS1}$, the PWM signal having a duty proportional to the difference between a desired output voltage Vo corresponding to the load current $I_{LOAD}$ and an actual output voltage Vo is output.

Accordingly, it is possible to supply a certain power supply voltage $V_{LOAD}$ desired for the load. More specifically, by increasing the voltage of the non-inversion input terminal of the error amplifier 22 in proportion to the load current $I_{LOAD}$, it is possible to increase the output voltage Vo when the load current $I_{LOAD}$ increases, whereas it is possible to reduce the output voltage Vo when the load current $I_{LOAD}$ decreases. Therefore, the power supply voltage $V_{LOAD}$ supplied to the load $R_L$ can be maintained at a predetermined voltage.

In this manner, the voltage $V_{LS2}$ obtained by adding the voltage $V_{LDS}$ proportional to the load current $I_{LOAD}$ to the reference voltage Vref is smoothed by the low pass filter 13 to generate the control signal Vc. Further, the voltage conversion unit 11 generates the level error voltage $V_{EA}$ corresponding to the load current $I_{LOAD}$ on the basis of the control signal Vc, and generates the PWM signal having a duty corresponding to the load current $I_{LOAD}$. Then, the switches M1 and M2 are turned on and off according to the PWM control signal. As a result, it is possible to supply the load $R_L$ with a constant power supply voltage $V_{LOAD}$ desired for the load $R_L$.

(Transfer Function)

Next, a transfer function will be considered with regard to the switching power supply circuit 1 in the first embodiment illustrated in FIG. 1.

Figure 2:
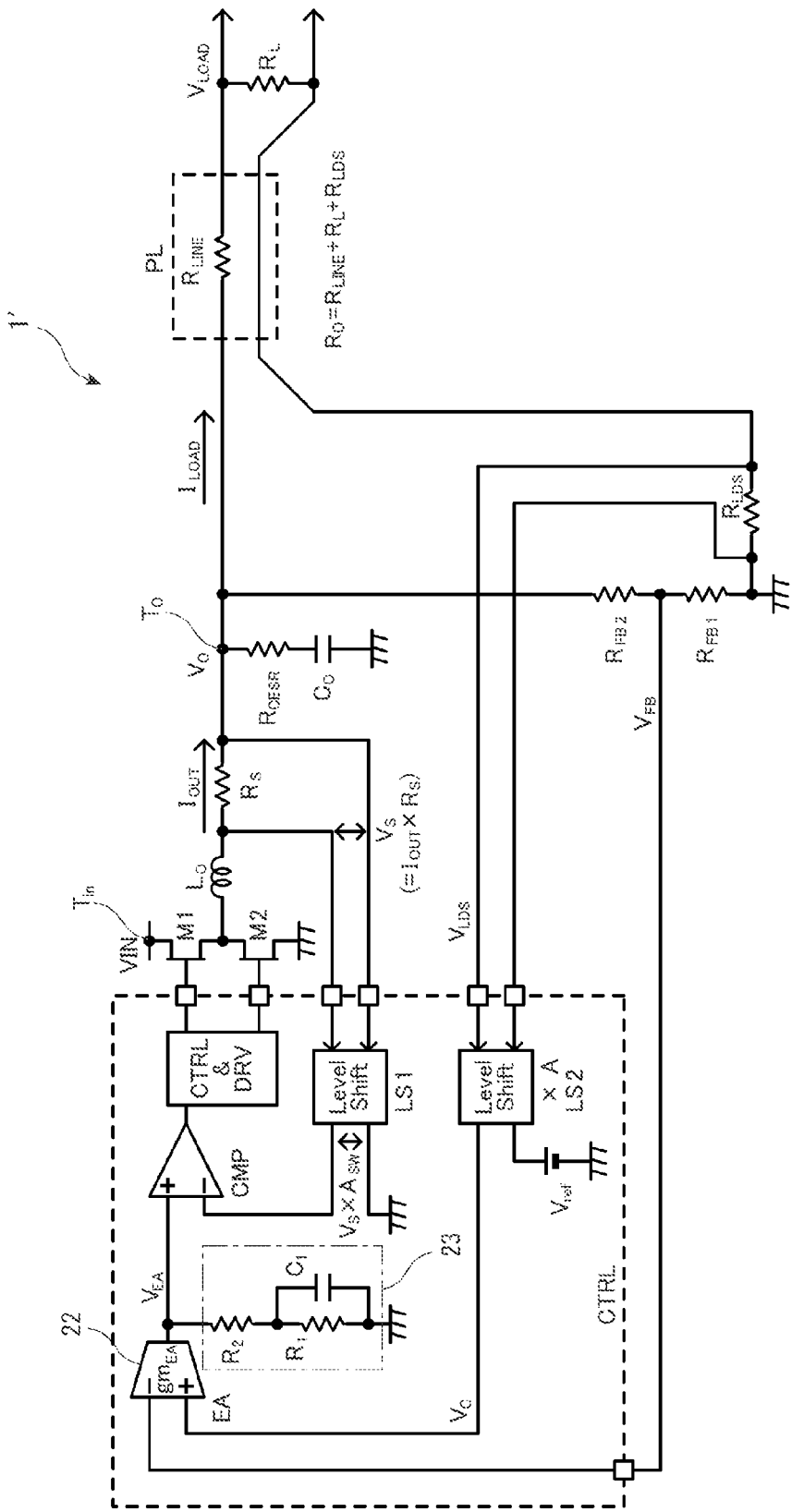
FIG. 2 is a schematic configuration diagram illustrative of a switching power supply circuit for explaining an effect of the present invention.

First, as a comparative example, the transfer function will be considered with regard to a switching power supply circuit 1' illustrated in FIG. 2.

FIG. 2 is a schematic configuration diagram illustrative of a switching power supply circuit for explaining an effect of the present invention.

The switching power supply circuit 1' illustrated in FIG. 2 has the same functional configuration as the switching power supply circuit 1 in the first embodiment illustrated in FIG. 1 except that the configuration of the control circuit CTRL is different. In FIG. 2, the same components as those of the switching power supply circuit 1 illustrated in FIG. 1 are denoted by the same reference signs.

In a control circuit CTRL of the switching power supply circuit 1', a level shift circuit LS2 receives a voltage $V_{LDS}$ across both ends of a sense resistance $R_{LDS}$, multiplies the voltage $V_{LDS}$ by A so as to be level-shifted, and generates a control signal Vc by adding a reference voltage Vref to the level-shifted voltage $V_{LDS}$. Then, the control signal Vc is input into a non-inversion terminal of the error amplifier 22.

The switching power supply circuit 1' is a feedback circuit. A transfer function making a loop from an input terminal of the error amplifier (EA) 22, through a phase compensation impedance unit 23, a comparator CMP, a control driver CTRL & DRV, switches M1 and M2, an inductor Lo, a sense resistance Rs, and an output capacitance Co, to a common connection part of resistances $R_{FB1}$ and $R_{FB2}$ can be expressed by the following Expression (1).

Figure 3:
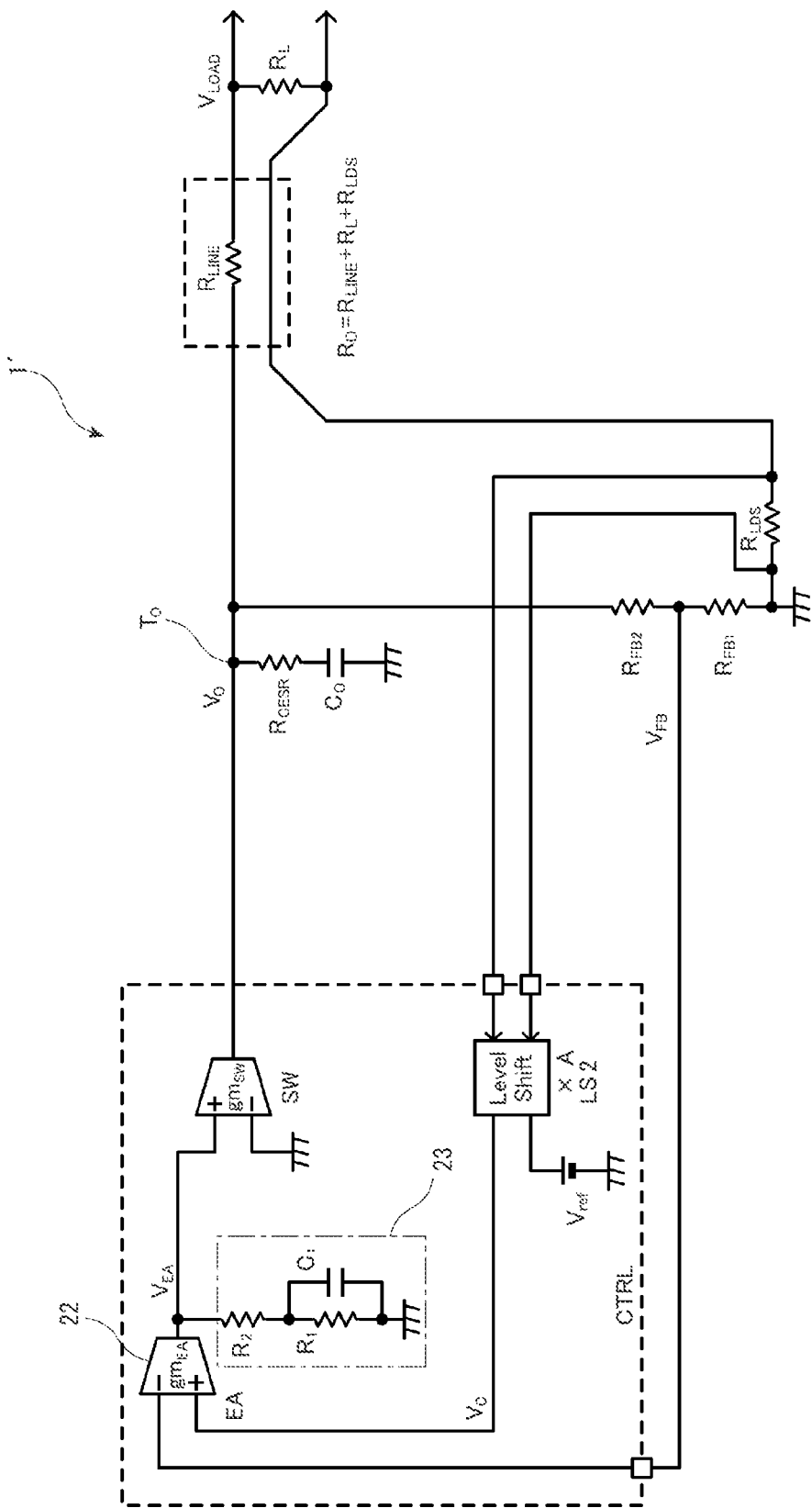
FIG. 3 is an explanatory diagram for explaining a transfer function of the switching power supply circuit illustrated in FIG. 2.

It is to be noted that, however, the comparator CMP, the control driver CTRL & DRV, the switches M1 and M2, the inductor Lo, the sense resistance Rs, and a level shift circuit LS1 can be regarded, as a whole, as a circuit for outputting an output current corresponding to a level error voltage $V_{EA}$, and are therefore defined as a voltage control current source SW. As a result, the switching power supply circuit 1' can be represented as the configuration as illustrated in FIG. 3. In FIG. 3, $gm_{SW}$ is a voltage current amplification factor of the voltage control current source SW. $R_0=R_{LINE}+R_L+R_{LDS}$ is a combined resistance of an internal resistance $R_{LINE}$, where a transmission line is PL, a load resistance is $R_L$, and the sense resistance is $R_{LDS}$, A is a gain of the level shift circuit LS2. $gm_{EA}$ is a voltage current amplification factor of the error amplifier 22. Vi is a difference between the reference voltage Vref and a feedback voltage (divided voltage) $V_{FB}$.

[Expression 1]

$$V_{FB} = G_0 \times \frac{(1 - sC_0 R_{LDS} A)\left\{1 + sC_1\left(\frac{R_1 R_2}{R_1 + R_2}\right)\right\}}{(1 + sC_0 R_0)(1 + sC_1 R_1)} \times V_i \quad (1)$$

In the Expression (1), $G_0$ is a DC gain and can be expressed by the following Expression (2).

[Expression 2]

$$G_0 = \frac{R_{FB1} R_{FB2}}{R_{FB1} + R_{FB2}} \times gm_{SW} \times R_0 \times gm_{EA} \times (R_1 + R_2) \quad (2)$$

It is understood from a first product term in a numerator of the Expression (1) that a positive zero point exists in the transfer function of the switching power supply circuit 1'. That is to say, the zero point exists on the Laplace right half plane in the transfer function of the switching power supply circuit 1'.

The zero point on the Laplace right half plane has a property that as the frequency increases, the gain increases, but the phase is delayed. In other words, the phase characteristic of the zero point on the Laplace right half plane is the same as that of a pole on the Laplace left half plane. In a transfer function, when a zero point on the Laplace right half plane exists, the phase rotates while being delayed despite a high gain. Therefore, the phase margin decreases, and the switching power supply circuit 1' is thereby likely to become unstable.

Figure 4A:
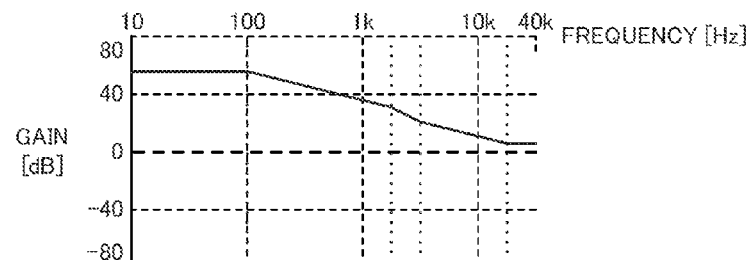
FIGS. 4A and 4B are bode diagrams illustrative of the characteristics of the switching power supply circuit illustrated in FIG. 2.
Figure 4B:
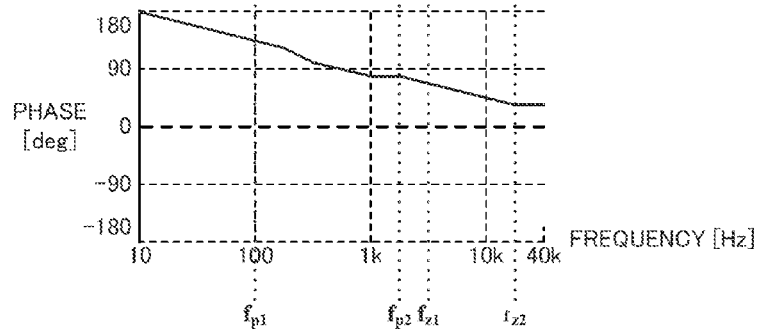
Figure 5A:
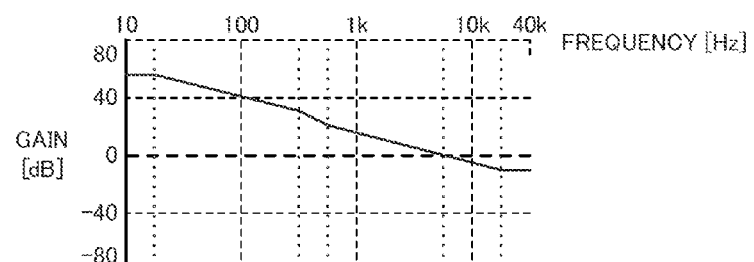
FIGS. 5A and 5B are bode diagrams for explaining the characteristics of the switching power supply circuit illustrated in FIG. 1.
Figure 5B:
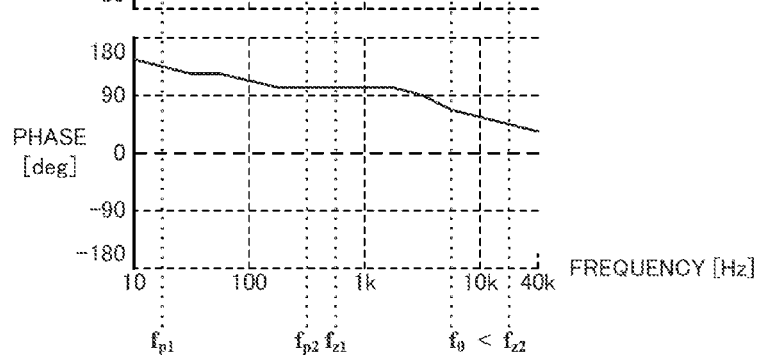

FIGS. 4A and 4B, and 5A and 5B are bode diagrams of the transfer function expressed by the Expression (1) of the switching power supply circuit 1'. FIGS. 4A and 5A represent the gain [dB], and FIGS. 4B and 5B represent the phase [deg]. Further, the horizontal axis represents the frequency, and the vertical axis represents the gain or the phase.

As illustrated in FIGS. 4A and 4B, in the transfer function expressed by the Expression (1), a first product term in a denominator corresponds to a first pole $f_{p1}$. The displacement amount of the gain becomes −20 dB/dec relative to an original displacement amount, and the phase is delayed by 90°. A second product term in the denominator corresponds to a second pole $f_{p2}$, and a second product term in a numerator corresponds to a first zero $f_{z1}$. The second pole $f_{p2}$ and the first zero $f_{z1}$ are formed on the Laplace plane at substantially the same position. Therefore, the amplitude characteristic and the phase characteristic are substantially cancelled. Further, the first product term in the numerator corresponds a second zero $f_{z2}$, and the displacement amount of the gain becomes +20 dB/dec relative to the original displacement amount. As a result, the phase is not returned, but delayed by further 90° in addition to a decrease in the attenuation amount of the gain. Therefore, the phase margin decreases.

Accordingly, in the switching power supply circuit 1', as illustrated in FIGS. 5A and 5B, it is needed to arrange the first pole $f_{p1}$ near the DC (low frequency side) so that a loop gain is made less than zero in a frequency lower than the second zero $f_{z2}$, namely, the frequency of the zero point on the Laplace right half plane, so as to ensure the phase margin and stabilize the switching power supply circuit 1'.

Therefore, the frequency band of the amplitude characteristic becomes narrow. When the frequency band of the amplitude characteristic becomes narrow, it is not possible to immediately respond to a rapid load variation. In other words, when the load current $I_{LOAD}$ varies, it takes time for the output voltage Vo to get a desired output voltage corresponding to the load current $I_{LOAD}$.

That is to say, in the switching power supply circuit 1', it is needed to make the frequency band narrow in order to ensure the stability. However, if the frequency band is made narrow, the response speed to load variation will become low.

Next, a transfer function of the switching power supply circuit 1 illustrated in FIG. 1 will be considered.

The transfer function making a loop from the input terminal of the error amplifier 22, through the phase compensation impedance unit 23, the comparator CMP, the control driver CTRL & DRV, the switches M1 and M2, the inductor Lo, the sense resistance Rs, and the capacitance Co, to the common connection part of the resistances $R_{FB1}$ and $R_{FB2}$ is obtained. In the switching power supply circuit 1, the low pass filter 13 is further cascade-connected to the output side of the signal generation unit 12 for correcting a voltage drop caused by the transmission line PL in addition to the configuration of the switching power supply circuit 1'.

Therefore, the transfer function of the switching power supply circuit 1 is obtained by assigning the product of the transfer function of the low pass filter 13 as a voltage drop correction amount $R_{LDS}A$ in the first product term in the numerator of the Expression (1). That is, the transfer function of the switching power supply circuit 1 can be expressed by the following Expression (3).

[Expression 3]

$$V_{FB} = G_0 \times \frac{\left\{1 - sC_0 R_S A \frac{1/sC_{LPF}}{R_{LP} + 1/sC_{LPF}}\right\}\left\{1 + sC_1\left(\frac{R_1 R_2}{R_1 + R_2}\right)\right\}}{(1 + sC_0 R_0)(1 + sC_1 R_1)} \times V_i \quad (3)$$

Further, the Expression (3) is organized, and thereby expressed by the following Expression (4).

[Expression 4]

$$V_{FB} = G_0 \times \frac{\{1 + s(C_{LPF} R_{LPF} - C_0 R_{LDS} A)\}\left\{1 + sC_1\left(\frac{R_1 R_2}{R_1 + R_2}\right)\right\}}{(1 + sC_{LPF} R_{LPF})(1 + sC_0 R_0)(1 + sC_1 R_1)} \times V_i \quad (4)$$

It is understood from a first product term of the Expression (4) that the zero point on the Laplace right half plane can be made closer to the Laplace left half plane by adding the low pass filter 13.

That is to say, in the switching power supply circuit 1 that includes the low pass filter 13 arranged on the output side of the level shift circuit LS2, the zero point on the Laplace right half plane can be made closer to the Laplace left half plane. It is thus possible to suppress the phase rotation in a frequency having a high gain of the transfer function of a feedback loop. Therefore, in comparison with the switching power supply circuit 1' that does not have the low pass filter 13 illustrated in FIG. 2, the phase compensation of the feedback loop is easily obtainable, that is, the stable operation is achievable.

As a result, the frequency band can be made wider, and it is possible to make faster the response speed to the load variation.

Further, in the switching power supply circuit 1 illustrated in FIG. 1, the zero point on the Laplace right half plane can be shifted to the Laplace left half plane by making a time constant $R_{LPF} C_{LPF}$ of the low pass filter 13 sufficiently larger than the product of a capacitance value Co of the output capacitance Co, a resistance value $R_{LDS}$ of the sense resistance $R_{LDS}$, and the gain A. When the zero point exists on the left half plane, the phase does not rotate in a delayed direction, but rotate in an advancing direction. Therefore, the switching power supply circuit 1 can be further stabilized.

In the switching power supply circuit 1, a transfer function when $R_{LPF} C_{LPF} \gg C_0 R_{LDS} A$ is satisfied is expressed by the following Expression (5). The symbol ">>" indicates that the left side is sufficiently larger than the right side.

[Expression 5]

$$V_{FB} = G_0 \times \frac{\left\{1 + sC_1\left(\frac{R_1 R_2}{R_1 + R_2}\right)\right\}}{(1 + sC_0 R_0)(1 + sC_1 R_1)} \times V_i \quad (5)$$

Figure 6A:
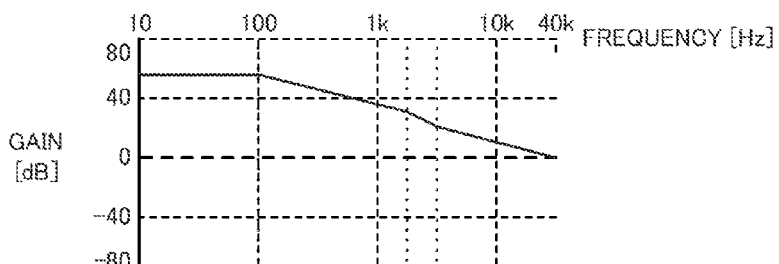
FIGS. 6A and 6B are bode diagrams for explaining the characteristics of the switching power supply circuit illustrated in FIG. 1.
Figure 6B:
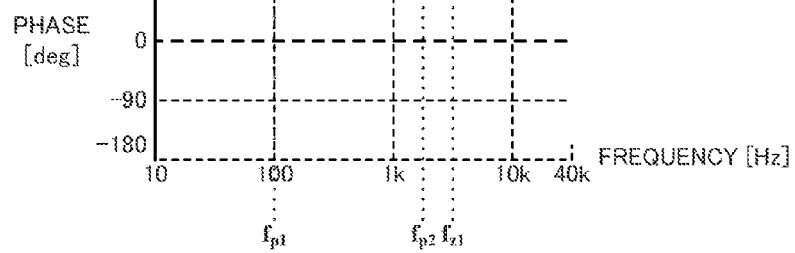

FIGS. 6A and 6B are bode diagrams of the transfer function expressed by the Expression (5).

It is understood from the Expression (5) and FIGS. 6A and 6B that the phase delay is approximately 90° at maximum. As a result, when $R_{LPF} C_{LPF} \gg C_0 R_{LDS} A$ is satisfied, the phase margin can be constantly ensured, that is, the stable operation can be achieved. Therefore, the frequency band can be made further wider, and the response speed to the load variation can be made further higher.

In particular, as represented by a multifunction mobile phone such as a smart phone or a digital camera which performs power transmission and data transmission through a USB cable, multiple functions of an electronic device to become the load of the power supply are more advanced these years, and the speed of the load variation becomes faster. Therefore, the switching power supply circuit 1 which quickly responds to the load variation in this manner is desirable.

Second Embodiment

Next, the second embodiment of the present invention will be described.

Figure 7:
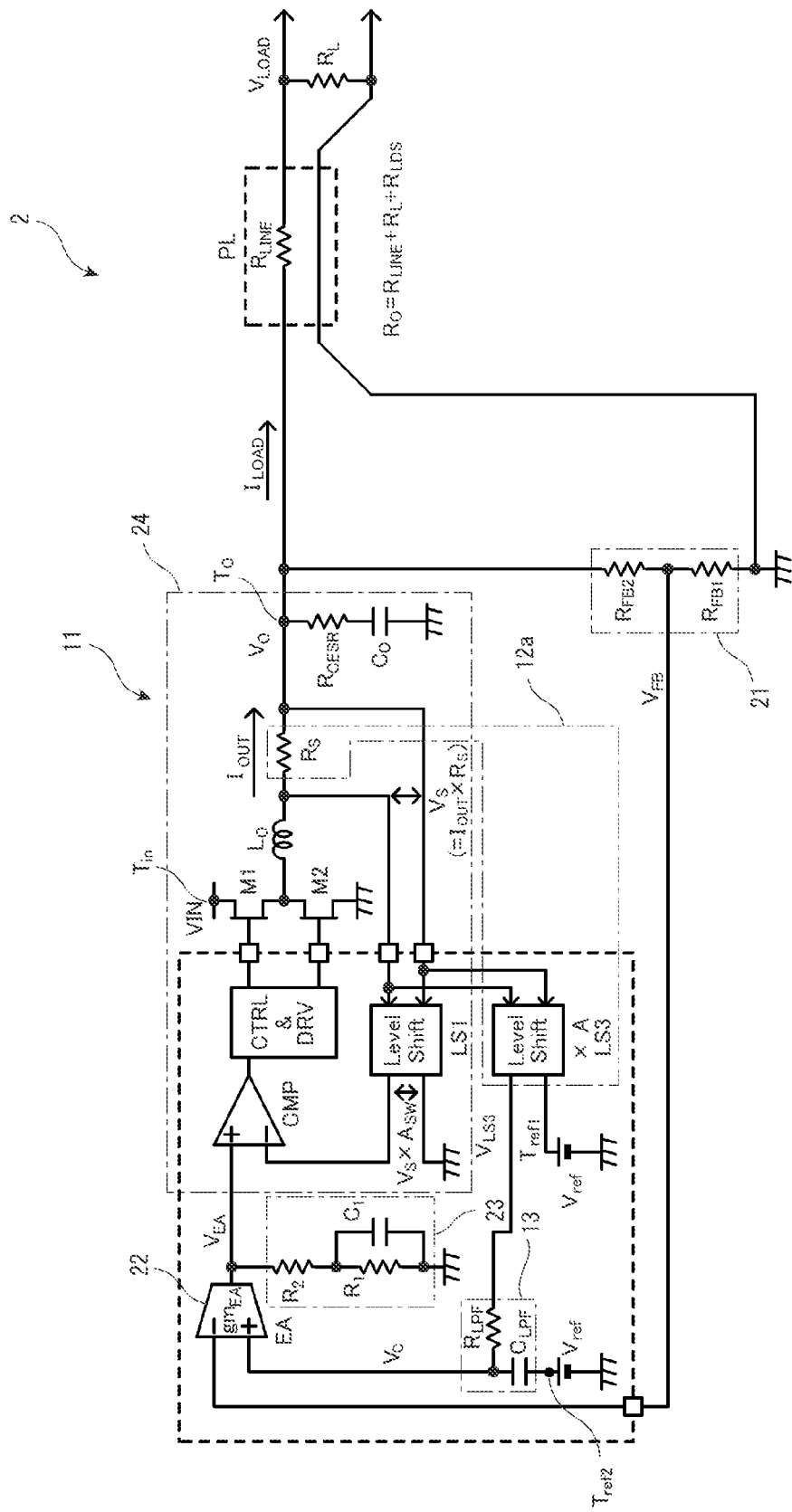
FIG. 7 is a schematic configuration diagram illustrative of an example of a switching power supply circuit to which a second embodiment of the present invention is applied.

FIG. 7 is a schematic configuration diagram illustrative of an example of a switching power supply circuit to which the second embodiment of the present invention is applied.

The switching power supply circuit according to the second embodiment is the same as the switching power supply circuit 1 according to the first embodiment except that the configuration of the signal generation unit 12 is different. Therefore, the same components will be denoted by the same reference signs, and a detailed description thereof will be omitted.

In the switching power supply circuit 1 of FIG. 1, a signal corresponding to a voltage drop is generated by the sense resistance $R_{LDS}$ arranged between the load $R_L$ and the ground and the level shift circuit LS2. On the other hand, as illustrated in FIG. 7, a signal generation unit 12a in a switching power supply circuit 2 according to the second embodiment includes: a sense resistance Rs arranged between an inductor Lo and an output terminal To; and a level shift circuit LS3.

More specifically, in the signal generation unit 12a, a voltage Vs across both ends of the sense resistance Rs is input into the level shift circuit LS3, the input voltage Vs is amplified at an amplification factor A, and the amplified voltage Vs is added to a reference voltage Vref to generate a voltage corresponding to an output current Iout.

Further, a low pass filter 13 is connected to an output side of the level shift circuit LS3.

Since the output current Iout includes a load current $I_{LOAD}$ which is a DC component, the load current $I_{LOAD}$ flowing through a transmission line PL can be monitored with this configuration. Further, since the output current Iout is a triangular wave current, the voltage Vs across the both ends of the sense resistance Rs also becomes a triangular wave voltage. However, the triangular wave voltage Vs is smoothed by the low pass filter 13 which is cascade-connected (connected in series) to the level shift circuit LS3, and output as a control signal Vc. The smoothed control signal Vc corresponds to the DC component of the output current Iout, and is a voltage proportional to the load current $I_{LOAD}$. That is, a voltage obtained by adding the smoothed voltage $V_{LS3}$ to the reference voltage Vref corresponding to a power supply voltage $V_{LOAD}$ of the load $R_L$ is input into the voltage conversion unit 11, as the control signal Vc.

The low pass filter 13 has a function of extracting a component corresponding to the load current $I_{LOAD}$ from the triangular wave output current Iout, in addition to a function of making the frequency band of a feedback loop wider. With such a configuration, the sense resistance Rs can be shared between the voltage conversion unit 11 and the signal generation unit 12a.

The transfer function of the switching power supply circuit 2 illustrated in FIG. 7 is expressed by the following Expression (6). Specifically, the Expression (6) is obtained by replacing the sense resistance $R_{LDS}$ with the sense resistance Rs in the Expression (4).

[Expression 6]

$$V_{FB} = G_0 \times \frac{\{1+s(C_{LPF}R_{LPF} - C_0R_SA)\}\{1+sC_1\left(\frac{R_1R_2}{R_1+R_2}\right)\}}{(1+sC_{LPF}R_{LPF})(1+sC_0R_0)(1+sC_1R_1)} \times V_i \quad (6)$$

In the switching power supply circuit 2, since the sense resistance $R_{LDS}$ is merely replaced with the sense resistance Rs, the transfer function and the bode diagram when $R_{LPF}C_{LPF} \gg C_0R_SA$ is satisfied are the same as those when $R_{LPF}C_{LPF} \gg C_0R_{LDS}A$ is satisfied in the switching power supply circuit 1.

Therefore, also in the second embodiment, the same effect as that of the first embodiment can be obtained, and the sense resistance Rs can be shared between the voltage conversion unit 11 and the signal generation unit 12a. As a result, the number of components can be reduced, and downsizing of the circuit is achievable.

Third Embodiment

Next, the third embodiment of the present invention will be described.

Figure 8:
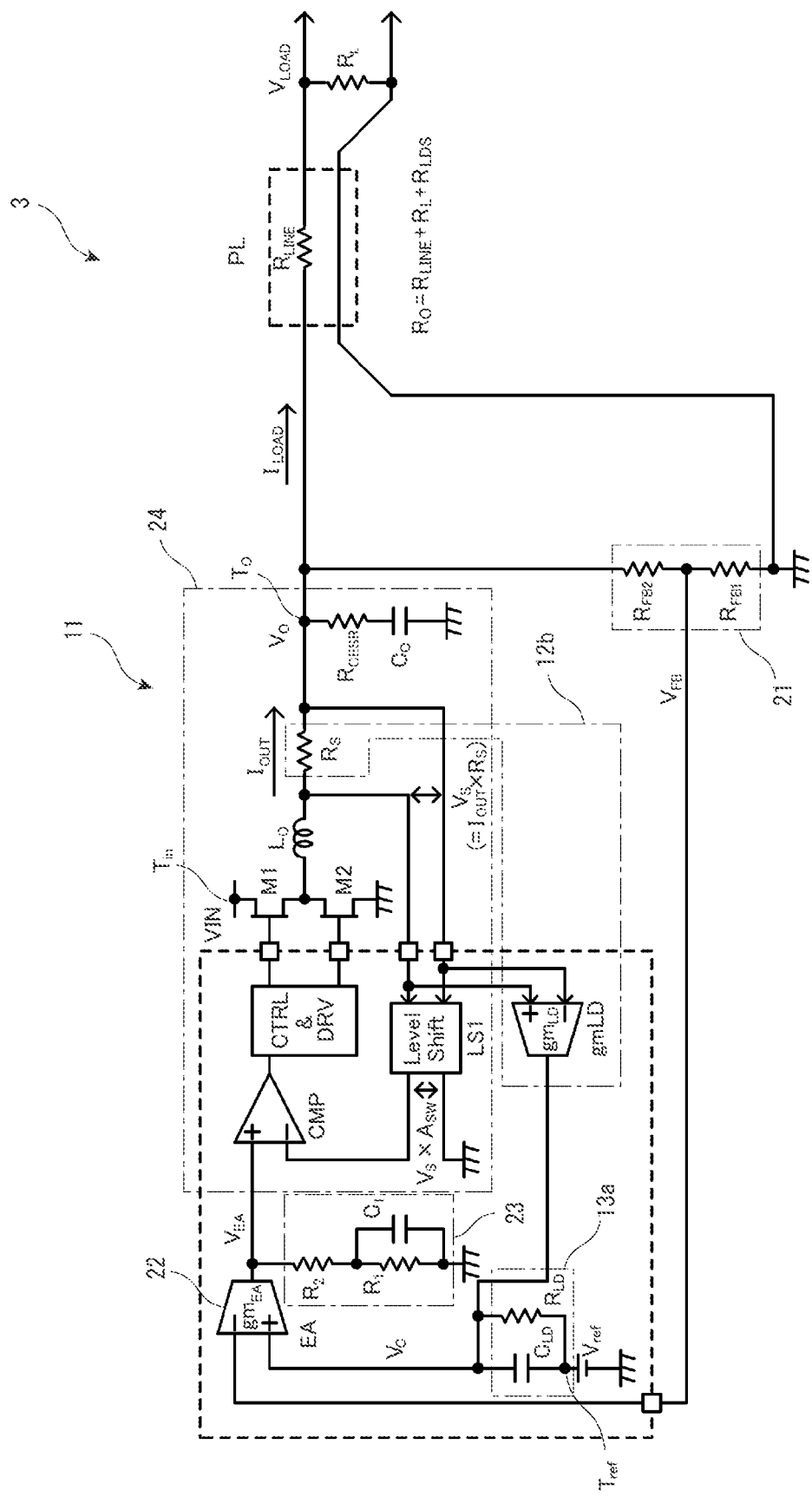
FIG. 8 is a schematic configuration diagram illustrative of an example of a switching power supply circuit to which a third embodiment of the present invention is applied.

FIG. 8 is a schematic configuration diagram illustrative of an example of a switching power supply circuit to which the third embodiment of the present invention is applied.

The switching power supply circuit 3 according to the third embodiment is the same as the switching power supply circuit 2 according to the second embodiment except that the configurations of the signal generation unit 12a and the low pass filter 13 are different. Therefore, the same components will be denoted by the same reference signs, and a detailed description thereof will be omitted.

A signal generation unit 12b of the switching power supply circuit 3 according to the third embodiment includes: a sense resistance Rs arranged between an inductor Lo and an output terminal To; and a transconductance amplifier gmLD. A low pass filter 13a includes a resistance $R_{LD}$ and a capacitance $C_{LD}$ arranged in parallel to each other between a non-inversion input terminal of the error amplifier 22 and a reference voltage terminal Tref which has a reference voltage Vref.

The signal generation unit 12b shares the sense resistance Rs with the voltage conversion unit 11 in the same manner as in the signal generation unit 12a of the switching power supply circuit 2 according to the second embodiment. A voltage Vs across both ends of the sense resistance Rs is amplified at an amplification factor gmLD by the transconductance amplifier gmLD, and converted from voltage into current. The transconductance amplifier gmLD outputs a triangular wave current corresponding to an output current Iout. Since the output current Iout includes a load current $I_{LOAD}$, the load current $I_{LOAD}$ can be monitored with this configuration.

Further, the low pass filter 13a smooths the triangular wave current output from the transconductance amplifier gmLD and converts the current to voltage, and then generates a control signal Vc of the voltage conversion unit 11. As with the low pass filter 13 of the switching power supply circuit 2 according to the second embodiment, the low pass filter 13a has a function of extracting a component corresponding to the load current $I_{LOAD}$ from the triangular wave output current Iout, in addition to a function of making the frequency band of a feedback loop wider. With such a configuration, the sense resistance can be shared between the voltage conversion unit 11 and the signal generation unit 12b.

A transfer function of the switching power supply circuit 3 according to the third embodiment is obtained by replacing the resistance $R_{LPF}$ of the low pass filter with the resistance $R_{LD}$, the capacitance $C_{LPF}$ of the low pass filter with the capacitance $C_{LD}$, and the amplification factor A of the level shift circuit LS3 with the voltage current amplification factor $gm_{LD}$ in the Expression (6). Therefore, the transfer function of the switching power supply circuit 3 is expressed by the following Expression (7).

[Expression 7]

$$V_{FB} = G_0 \times \frac{\{1+s(C_{LD}R_{LD} - C_0R_Sgm_{LD})\}\{1+sC_1\left(\frac{R_1R_2}{R_1+R_2}\right)\}}{(1+sC_{LD}R_{LD})(1+sC_0R_0)(1+sC_1R_1)} \times V_i \quad (7)$$

Further, in the switching power supply circuit 3, since the resistance $R_{LPF}$ of the low pass filter is merely replaced with the resistance $R_{LD}$, the capacitance $C_{LPF}$ of the low pass filter is merely replaced with the capacitance $C_{LD}$, and the amplification factor A of the level shift circuit LS3 is merely replaced with the amplification factor $gm_{LD}$ of the transconductance amplifier gmLD, a transfer function and a bode diagram when $R_{LD}C_{LD} \gg C_0Rsgm_{LD}$ is satisfied are the same as the transfer function and the bode diagram of the switching power supply circuit 2 according to the second embodiment.

As described above, in the switching power supply circuit 3 according to the third embodiment, the same effect as the switching power supply circuit 1 according to the first embodiment is obtainable, and the sense resistance Rs can be shared between the voltage conversion unit 11 and the signal generation unit 12b in the same manner as in the switching power supply circuit 2 according to the second embodiment. As a result, the number of components can be reduced, and downsizing of the circuit is achievable. Also in this case, the switching power supply circuit 3 can be further stabilized by making a time constant of the low pass filter 13a sufficiently larger than the product of a capacitance value Co of the output capacitance Co, a resistance value of the sense resistance Rs, and the voltage current amplification factor $gm_{LD}$ of the transconductance amplifier gmLD.

Further, in the third embodiment, there has been described a case where the transconductance amplifier gmLD is used instead of the level shift circuit LS3 of the switching power supply circuit 2 according to the second embodiment. However, the transconductance amplifier gmLD can also be used instead of the level shift circuit LS2 of the switching power supply circuit 1 according to the first embodiment.

Furthermore, in each of the above embodiments, there has been described the case where the switching power supply circuit 1 having the circuit configuration illustrated in FIG. 1 is partially modified, on the basis of the switching power supply circuit 1. However, the present invention is not limited thereto, and is also applicable to a switching power supply circuit that further includes another element or a switching power supply circuit that includes different elements from those of the switching power supply circuit 1.

It should be noted that the scope of the present invention is not limited to the illustrative embodiments herein shown or described, and thus includes all embodiments that bring equivalent effects that are objects of the present invention. Further, the scope of the present invention is not limited to combinations of the features of the invention defined by the claims, and can be defined by all desired combinations of specific features among all of the disclosed features.

REFERENCE SIGNS LIST

1, 2, 3 switching power supply circuit
11 voltage conversion unit
12, 12a, 12b signal generation unit
13, 13a low pass filter
21 resistance division circuit
22 error amplifier
23 phase compensation impedance unit
24 output voltage generation unit
gmLD transconductance amplifier
LS1, LS2, LS3 level shift circuit
M1, M2 switch
PL transmission line
$R_L$ load resistance
Rs sense resistance
$R_{LDS}$ sense resistance

The invention claimed is:

1. A switching power supply circuit for supplying a power supply voltage to a load through a transmission line, the switching power supply circuit comprising:
   a voltage conversion unit for receiving an input voltage, converting the input voltage into an output voltage having a magnitude corresponding to a control signal, and outputting the output voltage to the transmission line;
   a signal generation unit for generating a signal corresponding to a voltage to be dropped in the transmission line on the basis of a current flowing through the transmission line, the signal generation unit including a sense resistance electrically connected in series to the transmission line, and a level shift circuit for level-shifting a voltage across both ends of the sense resistance to a voltage based on a reference voltage corresponding to the power supply voltage; and
   a low pass filter for receiving the signal generated in the signal generation unit, smoothing the input signal, and outputting the control signal to the voltage conversion unit, the low pass filter including a resistance element having one end connected to an output end of the level shift circuit, and a capacitance element having one end connected to the other end of the resistance element, and the other end connected to a reference voltage terminal having the reference voltage.

2. The switching power supply circuit according to claim 1, wherein the voltage conversion unit includes an output capacitance connected between an output terminal of the voltage conversion unit and a ground; and
   wherein a time constant of the low pass filter is larger than a product of a capacitance value of the output capacitance, a resistance value of the sense resistance, and an amplification factor of the level shift circuit.

3. The switching power supply circuit according to claim 1, wherein the voltage conversion unit includes: an inductor connected between an input terminal to which the input voltage is input and an output terminal of the voltage conversion unit, and an output capacitance connected between the output terminal and a ground; and
   wherein the sense resistance is connected between the inductor and the output capacitance and monitors a current flowing through the inductor.

4. The switching power supply circuit according to claim 2, wherein the voltage conversion unit includes: an inductor connected between an input terminal to which the input voltage is input and an output terminal of the voltage conversion unit, and the output capacitance; and
   wherein the sense resistance is connected between the inductor and the output capacitance and monitors a current flowing through the inductor.

5. A switching power supply circuit for supplying a power supply voltage to a load through a transmission line, the switching power supply circuit comprising:
   a voltage conversion unit for receiving an input voltage, converting the input voltage into an output voltage having a magnitude corresponding to a control signal, and outputting the output voltage to the transmission line;
   a signal generation unit for generating a signal corresponding to a voltage to be dropped in the transmission line on the basis of a current flowing through the transmission line, the signal generation unit including a sense resistance electrically connected in series to the transmission line, and a transconductance amplifier for amplifying a voltage across both ends of the sense resistance and outputting a current corresponding to the voltage across the both ends of the sense resistance; and
   a low pass filter for receiving the signal generated in the signal generation unit, smoothing the input signal, and outputting the control signal to the voltage conversion unit, the low pass filter including a resistance element and a capacitance element, the resistance element and the capacitance element being connected in parallel to each other between an output end of the transconductance amplifier and a reference voltage terminal having a reference voltage corresponding to the power supply voltage.

6. The switching power supply circuit according to claim 5, wherein the voltage conversion unit includes an output capacitance connected between an output terminal of the voltage conversion unit and a ground; and
   wherein a time constant of the low pass filter is larger than a product of a capacitance value of the output capacitance, a resistance value of the sense resistance, and an amplification factor of the transconductance amplifier.

7. The switching power supply circuit according to claim 6,
wherein the voltage conversion unit includes: an inductor connected between an input terminal to which the input voltage is input and the output terminal of the voltage conversion unit; and wherein the sense resistance is connected between the inductor and the output capacitance and monitors a current flowing through the inductor.

8. The switching power supply circuit according to claim 5,
wherein the voltage conversion unit includes: an inductor connected between an input terminal to which the input voltage is input and an output terminal of the voltage conversion unit, and an output capacitance connected between the output terminal and a ground; and wherein the sense resistance is connected between the inductor and the output capacitance and monitors a current flowing through the inductor.

* * * * *